No. 756,127. PATENTED MAR. 29, 1904.
M. MILLER.
ARMOR FOR VEHICLE TIRES.
APPLICATION FILED JAN. 4, 1904.
NO MODEL.
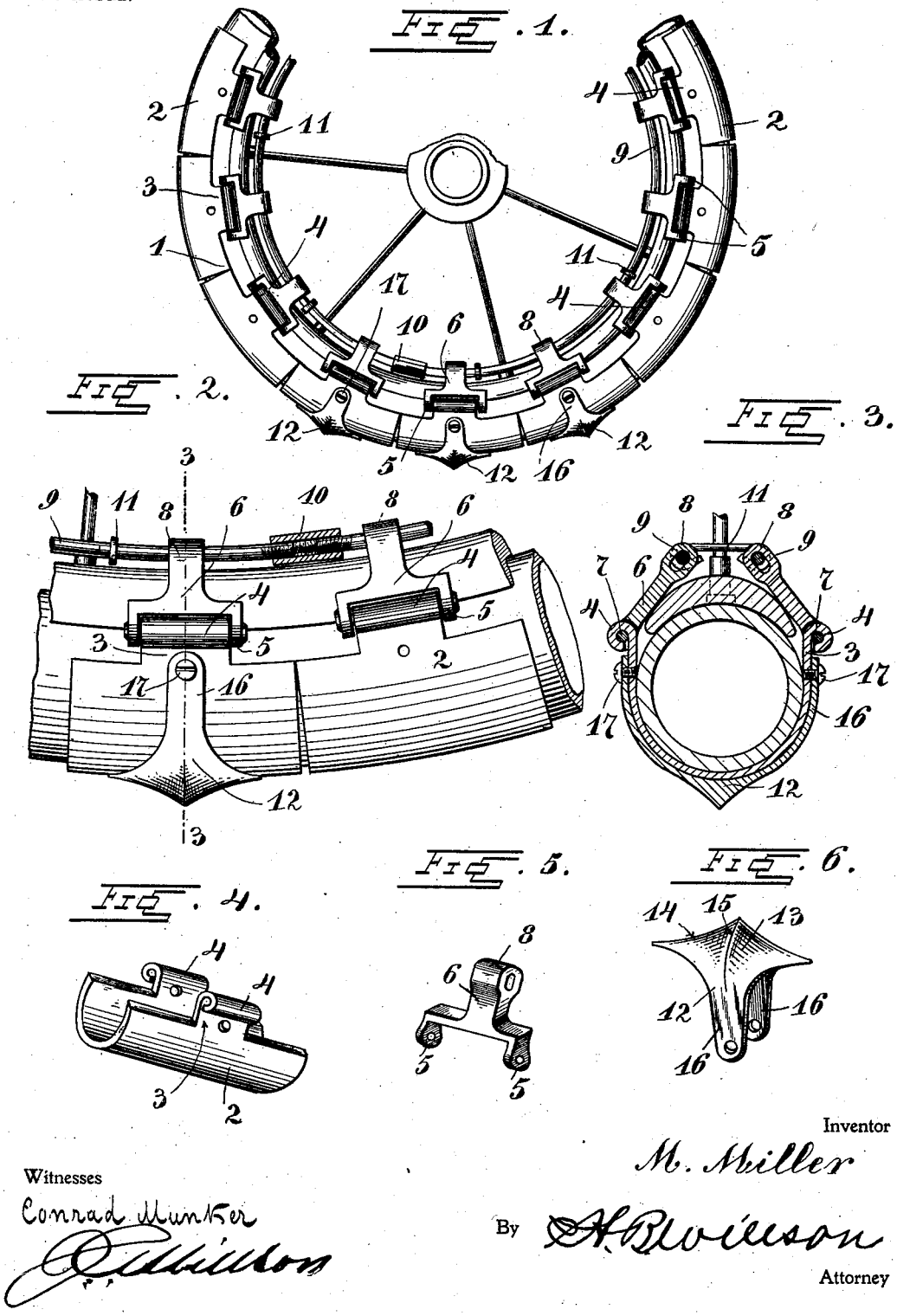

No. 756,127. Patented March 29, 1904.

UNITED STATES PATENT OFFICE.

MAJOR MILLER, OF CLYMAN, WISCONSIN.

ARMOR FOR VEHICLE-TIRES.

SPECIFICATION forming part of Letters Patent No. 756,127, dated March 29, 1904.

Application filed January 4, 1904. Serial No. 187,701. (No model.)

*To all whom it may concern:*

Be it known that I, MAJOR MILLER, a citizen of the United States, residing at Clyman, in the county of Dodge and State of Wisconsin, have invented certain new and useful Improvements in Armor for Vehicle-Tires; and I do declare the following to be a full, clear, and exact description of the invention, such as will enable others skilled in the art to which it appertains to make and use the same.

My invention relates to improvements in armor for pneumatic tires of automobiles, bicycles, and other vehicles.

One object of my invention is to provide a simple, durable, and comparatively inexpensive device of this character which will be very efficient in preventing the tire from being cut or punctured and which may be readily applied to, adjusted upon, and removed from the rim of a vehicle-wheel.

A further object is to provide a calk attachment for the armor to prevent the wheel from slipping upon muddy or icy ground.

With these and other objects in view the invention consists of certain novel features of construction, combination, and arrangement of parts, as will be more fully described, and particularly pointed out in the appended claims.

In the accompanying drawings, Figure 1 is a side elevation of a vehicle-wheel, showing the application of my improved armor or guard to the tire of the same. Fig. 2 is a side elevation, on an enlarged scale, of a portion of the wheel, one of my calk attachments being shown applied to one of the plates or shields of the armor. Fig. 3 is a section taken on the line 3 3 of Fig. 2. Fig. 4 is a perspective view of one of the plates or shields of the armor or guard. Fig. 5 is a similar view of one of the connecting-yokes to which the armor plates or shields are pivoted. Fig. 6 is a perspective view of the under side of one of the detachable calks.

Referring to the drawings by numeral, 1 denotes my improved tire armor or guard, which consists of a series of counterpart plates or shields 2, disposed end to end and adapted to encompass the tread of the tire, as shown. Each of said armor plates or shields 2 consists of a curved piece of sheet metal, preferably spring-steel, formed with reduced portions 3, which terminate in parallel eyes 4, and having their contacting ends slightly concave or cut away at the center, as shown, in order to permit them to yield with the rubber tire as it is compressed. The said eyes are pivoted between the arms 5 of the forked or bifurcated ends of connectors or yokes 6 by passing pivot-pins 7 through said eyes and the apertures in said arms 5. The opposite ends 8 of said connectors or yokes 6 are formed with elongated openings or slots, through which retaining-rings 9 are passed in order to secure the armor or guard upon the wheel. The said retaining-rings may be made of loosely-connected sections, but they are preferably in the form of circular wires or rods, which have their meeting ends reversely screw-threaded and connected by suitable screw-threaded sleeves or turnbuckles 10, by means of which the size of the rings may be varied to adjust the armor or guard upon the tire, as will be readily understood. In order to more effectively hold the armor upon the wheel, the retaining-rings 9 upon each side of the rim are connected at suitable intervals by connecting loops or links 11, as clearly seen in Fig. 3.

In order to prevent the wheel from slipping on muddy or icy ground, I provide the armor or guard with detachable calks 12, one of which may be secured to each of the armor-plates or shield-sections 2. The said calks consist of a body portion 13, having longitudinal and transverse ribs 14 and 15, with a point or spur at their intersection. Curved arms 16 are formed upon each side of said body portion, so as to straddle the armor-plates 2, and they are secured to the same by bolts, screws, or other fastening means 17, which are passed through apertures or openings formed in said arms and in the reduced ends of the armor-plates, as shown. It will be seen that these calk attachments may be easily and quickly applied to or removed from the armor-plates when necessary.

The use and many advantages of my invention will be readily understood from the foregoing description, taken in connection with the accompanying drawings.

It will be seen that the device will effectively prevent a puncture or other injury to the tire and at the same time its use will not interfere with the elasticity or resilience of the tire. By loosening the turnbuckles 10 and removing the links 11 the armor may be quickly removed from the wheel.

It will be understood that I do not limit myself to the construction herein disclosed, since various changes in the form, proportion, and the minor details of construction may be resorted to without departing from the principle or sacrificing any of the advantages of this invention.

Having thus described my invention, what I claim as new, and desire to secure by Letters Patent, is—

1. A tire-armor comprising a series of shields, connectors pivotally attached to said shields, and retaining-rings connecting said connectors, substantially as described.

2. A tire-armor comprising a series of abutting shields, connectors pivotally attached to said shields, retaining-rings connecting said connectors, and means for adjusting said retaining-rings, substantially as described.

3. A tire-armor comprising a series of shields, connectors pivotally attached to said shields, retaining-wires uniting said connectors on each side of the tire, and means for connecting said retaining-wires, substantially as described.

4. A tire-armor comprising a series of abutting shields, connectors pivotally attached to said shields, retaining-wires uniting said connectors on each side of the tire, and links for connecting said retaining-wires, substantially as described.

5. A tire-armor comprising a continuous series of counterpart shields having reduced portions formed with eyes, yokes or connectors having bifurcated ends pivotally connected to the said eyes and having openings in their opposite ends, and retaining-wires passed through said openings in said yokes or connectors, substantially as described.

6. A tire-armor comprising a continuous series of counterpart abutting shields having reduced portions formed with eyes, yokes or connectors having bifurcated ends pivotally connected to the said eyes and having openings in their opposite ends, adjustable retaining-wires passed through said openings in said yokes or connectors, and links connecting said retaining-wires, substantially as described.

7. The combination with a vehicle-wheel of a series of loosely-connected plates, means for securing said series of plates upon said wheel, and calks detachably secured to said plates, substantially as described.

8. The combination with a tire-armor comprising a series of abutting shields, of calks removably secured to said shields, substantially as described.

In testimony whereof I have hereunto set my hand in presence of two subscribing witnesses.

MAJOR MILLER.

Witnesses:
 JAS. T. WALSH,
 J. A. BUNNELL.